March 30, 1937. J. E. LILIENFELD 2,075,351
ELECTROLYTIC CONDENSER
Filed Nov. 27, 1934  2 Sheets-Sheet 1
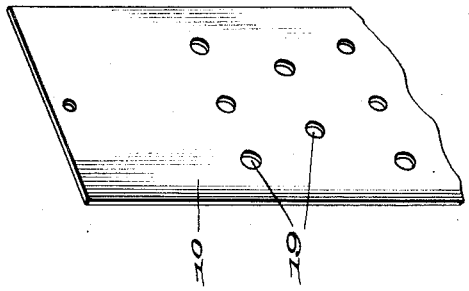
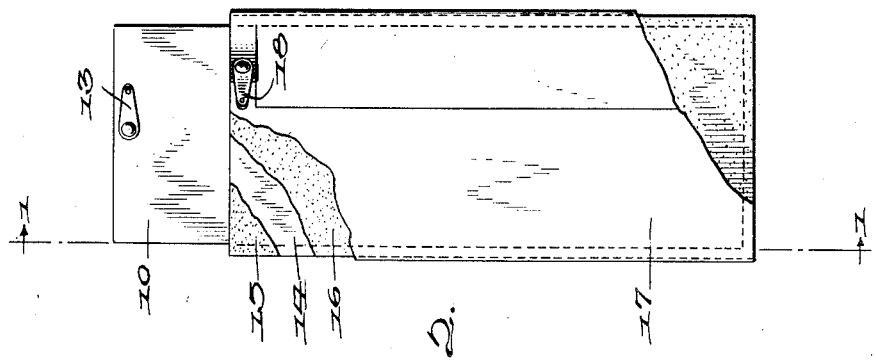
Inventor
Julius Edgar Lilienfeld,
By Emery, Booth, Varney & Holcombe
Attorneys March 30, 1937.         J. E. LILIENFELD         2,075,351
                    ELECTROLYTIC CONDENSER
                    Filed Nov. 27, 1934         2 Sheets-Sheet 2

Inventor

Julius Edgar Lilienfeld,

By Emery, Booth, Janney & Holcombe

Attorneys

Patented Mar. 30, 1937

2,075,351

UNITED STATES PATENT OFFICE 2,075,351

ELECTROLYTIC CONDENSER

Julius Edgar Lilienfeld, Winchester, Mass., assignor, by mesne assignments, to The Magnavox Company, Fort Wayne, Ind., a corporation of Arizona Application November 27, 1934, Serial No. 755,056

17 Claims. (Cl. 175—315)

My invention aims to provide an improved type of electrolytic condenser, and relates especially to a structural unit having marked advantages for different fields of use.

An object of my invention is to provide a simple compact condenser unit of high efficiency, employing a minimum quantity of materials, and of such a design that it may be assembled with a minimum of labor.

A further object is to provide an electrolytic condenser having a plastic adhesive non-drying film-forming electrolyte in sheet form, serving as self-sufficient electrode spacing and retaining means, and comprising the only material between opposed anode dielectric surfaces.

A further object is to provide a condenser, with a plurality of superposed filmed anode strata or plates, which is free from cathode members interleaved with, or interposed between, the anode strata; and which has a cathode envelope surrounding the assembly of anode strata and retained in position by the electrolyte material.

The invention is not limited to these objects, and other objects and features of my invention will be made evident as the description progresses.

In the accompanying drawings, wherein the application of the invention is illustrated, Fig. 1 shows a vertical section of a stacked-anode condenser taken on the line 1—1 of Fig. 2;

Fig. 2 shows a front elevation of said condenser, partly broken away;

Fig. 3 shows in perspective a portion of an anode for employment in the condenser;

Fig. 4 shows a front elevation of a coiled-anode condenser, partly broken away;

Fig. 5 shows a plan view of the condenser illustrated in Fig. 4;

Fig. 6 shows diagrammatically a greatly magnified cross-section of an anode and electrolyte combination in the region of their juncture, illustrating the combination of anode and electrolyte employed in the preferred embodiments of my invention; and Fig. 7 shows the method of connecting condenser units; sub-figure (a) showing the connection to a direct-current source, and sub-figure (b) showing the connection to an alternating-current source.

Referring to Figs. 1 and 2, the condenser unit shown therein comprises a plurality of filmed anode strata in the form of a plurality of rectangular plates 10 stacked in parallel arrangement. Each anode plate is separated from the next adjacent one by a layer of plastic, low-specific resistance, non-drying electrolyte 11, which is adhesive and substantially non-flowing, thereby spacing the anodes apart and retaining them in their relative positions. No additional spacing means are used or needed, and due to the adhesive nature of the electrolyte preferably employed, the anode plates are securely retained in assembled position.

The anode plates are comprised of a filming-metal, preferably aluminum, and are filmed with a dielectric coating on all surfaces exposed to the electrolyte, as hereinafter described. The anode metal is preferably in the form of a thin foil, which may have a thickness of only 3 mils, and the anode plates are assembled in closely spaced relation, with an electrolyte layer between anodes which may be as little as 5 mils in thickness, thus making for great compactness and economy of material.

The particular kind of filmed-anode and electrolyte which I prefer to use is the subject-matter of a separate application for patent as hereinafter described.

In the form of condenser shown in Figs. 1 and 2, the spaces between the anode plates are not completely filled with electrolyte material, a substantial length of the anodes projecting out of the electrolyte to serve as cooling fins. The exposed portions of the anode plates are electrically joined by any suitable means, for example, a bolt or rivet 12 which passes through them, and to which is fastened soldering lug 13 for affording connection thereto, as shown in Figs. 1 and 2.

An outer electrode assembly, advantageously comprising floating cathode plates and an enclosing conductive wrapper, is provided for completing the condenser unit. As shown in the drawings, a stiff rectangular unfilmed metallic cathode plate 14, which may be of aluminum, is positioned outside of each outer anode plate in parallel spaced relation therewith, and is separated therefrom and retained in position by a thin layer 15 of the electrolyte material. Each of these cathode plates is preferably somewhat wider than the anodes, so as to project beyond the side edges thereof, and approximately coextensive with the electrolyte in length. Each cathode plate is assembled with its bottom edges extending slightly beyond the bottom edges of the anodes, and with its upper end terminating about where the anodes leave the electrolyte. These cathode plates thus form a pair of stiff conductive members between which the filmed anode plates are positioned, each plate being separated from its neighbor by a layer of the electrolyte which not only spaces them apart but holds them in spaced relation; the whole forming a more or less rigid body despite the flexibility of the foil anodes and of the thin layers of electrolyte.

The plates are compressed together, as in an arbor press, after assembly to the point just described, to cause sufficient extrusion of the electrolyte material from between the plates so that it will extend slightly beyond the side edges of the cathode plates. Or, as an alternative, additional electrolyte material may be applied across the edges of the anode plates so that the space lying between the cathode plates and around the anode plates will be filled with the electrolyte material, and so the latter will extend slightly beyond the side edges of the cathode plates. It is not necessary for the eletcrolyte to extend beyond the lower end edges of the anodes, although preferably they will be covered and protected thereby.

As the result of this construction the anode plates are individually and collectively surrounded by electrolyte material which contacts with the cathode plates so that a current can pass from either cathode plate to every point in the electrolyte, with a low internal resistance.

An advantage of the stiff cathode plates extending beyond the edges of the anode plates is to afford mechanical protection to the latter, reducing the possibility of the edges becoming mashed together in case of rough handling of the condenser.

The cathode plates 14 may be used directly as cathode terminals, preferably being joined by a metallic conductor, but I prefer to employ the additional elements next to be described.

Each of the cathode plates 14 is coated on the outside with a thin layer 16 of the electrolyte material so that these cathode plates, as well as the anode plates, are individually and collectively surrounded by electrolyte material. There is thus a layer of electrolyte material extending transversely about the entire assembly of plates, and which joins with the electrolyte material between the plates. The edges of the cathode plates need not be covered with electrolyte material, but this is preferred in order to afford a uniform plastic envelope.

In the preferred form of the invention a wrapper 17 of metallic foil, such as aluminum foil, is wrapped transversely about the electrolyte-covered assembly and serves as the terminal cathode. Due to the adhesive nature of the preferred electrolyte material with which it contacts it is held securely in position, and in permanent and effective contact with the electrolyte, without the employment of any clamping means. It will be evident that the wrapper imparts additional mechanical rigidity to the assembly; and that in addition it affords a protective covering for the electrolyte.

A plastic electrolyte is preferably employed which is sufficiently coherent and free from change in use that no sealing means are needed at the ends of the condenser to prevent dripping or to protect the electrolyte from the atmosphere, the use of such an electrolyte being shown in the drawings. In some cases it may, however, be advisable to provide end sealing means, such as thin strips of rubber placed between the electrodes, and in these cases the cathode wrapper will serve the function of side sealing means without additional provision therefor.

From the electrical standpoint, the important function of cathode wrapper 17 is that it serves as a single cathode terminal, to which connection can be made by means of soldering lug 18 which is riveted or otherwise fastened thereto, to and from which current can readily flow to and from all points on the filmed anode surfaces in contact with the electrolyte.

As no metallic connection is made to cathode plates 14, in this construction, they may be termed "floating cathodes". These floating cathodes may be omitted, particularly when stiff anode plates are used, but are preferably employed for mechanical reasons.

The anode plates 10 may be continuous and unbroken, as current can flow to the electrolyte material between the plates by way of the electrolyte material which connects with the cathode wrapper. The average over-all resistance offered to the flow of current depends upon the specific resistance of the electrolyte material and upon the dimensions and spacing of the anode plates.

In order to reduce the over-all resistance, when it otherwise would be greater than desired, the anode plates may be provided with openings or holes 19, as shown in Fig. 3, thus affording a more direct path for current to flow from the cathode wrapper to the interior of the electrolyte between the anodes. The plastic electrolyte readily fills these openings to provide connections. The edges of these openings should be filmed, or otherwise insulated, to prevent short-circuiting of the anode metal to the electrolyte.

An advantage of this form of construction is that anode plates of any width can be used satisfactorily, since the resistance is not solely dependent upon conduction through the outer edges of the electrolyte between the anode plates.

The greater the total area of these openings, relative to the total anode area within the electrolyte, the greater the decrease in the capacity of the condenser due to the diminution of the dielectric film area. Hence with closely spaced anode plates, such as those spaced 10 mils apart, there is an upper limit beyond which it is inexpedient to carry the increase in proportional area of the openings. This means that the electrolyte, with an anode spacing of this order, should preferably have a specific-resistance of the order of about 100 ohms/cm$^3$ or less, in order to obviate the necessity of an undue cutting down of anode area, and ordinarily the electrolytes which I use have specific-resistances of 10–50 ohms/cm$^3$.

It will of course be evident that in any case the efficiency will be greater the lower the specific-resistance of the electrolyte material.

Electrolytic condensers embodying my improved construction do not require cathode plates interposed between the anode plates and have the following advantages among others: (a) less electrolyte material is required whenever there are more than three anode plates, as is generally the case, since only one layer of electrolyte is needed between adjacent anodes; (b) less cathode metal is used; and (c) a much simpler assembly procedure is made possible due to the fact that the anode plates, after coating with a layer of electrolyte, can be directly stacked one upon the other, requiring less time and effort than when cathode plates are sandwiched in between. Many other advantages resulting from the various features of the described construction have already been indicated, or will be evident.

A coiled-anode type of condenser construction, embodying my invention, is shown in Figs. 4 and 5. Here, a single strip of filmed anode 20 is wound in helical form in order to be contained in a small volume, the turns being spaced apart by a thin layer 21 of the previously described electrolyte material. The anode strip may be conveniently wound on a mandrel, and when previously coated on the outer surface with a layer of the electrolyte material, will become automatically spaced, and the coil will have an outer layer 22 of electrolyte.

A strip of metal foil 23 is wrapped around the outside in contact with the enveloping layer of electrolyte 22 and serves as the cathode.

Soldering lugs 24 and 25 are secured to the coiled anode strip 20 and to the cathode wrapper 23, respectively, to afford terminal connections thereto.

By providing openings or holes in anode strip 20, as shown in Fig. 3 and described in connection with anode plate 10 of the stacked-anode type of condenser, which holes are filled with electrolyte material, the ready passage of current from cathode wrapper 23 to all parts of the electrolyte is facilitated.

The edges of the anode strip, at the top and bottom, may be covered with electrolyte material to permit flow of current inwardly between these edges from the cathode. It will be advantageous in some cases to provide metallic cathode disks at the top and bottom, in electrical contact with the electrolyte, to further facilitate the flow of current and thus reduce the overall resistance of the electrolyte.

This construction of coiled-anode condensers not only results in obvious compactness and economy of material as compared with forms in which a coiled-cathode is wound with the anode, but permits of a greatly simplified assembly procedure, since it is only necessary to wind one strip, i. e. the anode strip coated with the plastic and adhesive electrolyte. Where several superposed strips must be wound simultaneously, as in conventional forms employing a cathode strip and an anode strip, and often strips of fabric separators, these strips must be wound at different lineal rates and careful individual control is needed, and complicated winding apparatus is required for mechanical winding.

The above-described condenser units are adapted for direct current use individually, and for assembly in pairs for alternating-current use. A single unit as employed for direct-current use is connected as shown in Fig. 7 (a) with the anode connected to the positive side of the line and the cathode to the negative side.

For alternating-current use two condenser units are assembled or coupled with their cathodes electrically connected in order that each side of the line may be separately connected to an anode terminal, as shown in Fig. 7 (b).

The greater flexibility and adaptability of my improved units thus assembled in pairs will be readily apparent to those skilled in the art over the conventional construction of alternating-current condensers employing two sets of interleaved filmed anodes in a single unit.

*Special anode and electrolyte*

From the foregoing description it will be evident that the invention is not limited to constructions embodying anodes filmed in any special manner nor to the use of an electrolyte material containing any special ingredients.

It is only necessary that the anode surfaces be formed with a dielectric film, which may be done in any of the known ways, as for example by electrolyzing the anodes in an aqueous solution of boric acid and borax.

The electrolyte material should be plastic, and preferably adhesive, so as not to flow from between the electrode plates and so as to act as self-sufficient spacing and retaining means; and preferably should be so coherent and free from change that it will not flow or drip from the ends of the condenser even after prolonged operation, thus eliminating any need for end sealing means. It should also be non-drying in order to remain uniform in use and not produce dried masses which will interfere with the flow of current to all parts of the electrolyte from the external cathode, as would be the case otherwise, particularly with closely spaced anodes.

The electrolyte should also have a relatively low order of specific-resistance, preferably of about 100 ohms or less, in order to obtain a good efficiency and to avoid the necessity of an undue reduction of anode area by means of holes or openings therein. The electrolytes employed in electrolytic condensers are generally film-forming in nature in order to permit healing of the dielectric film in case of puncture, and the electrolyte used should also have this property.

I prefer to use the new and original combination of anode and electrolyte shown in Fig. 6. The electrolyte comprises a mixture containing as a component a film-forming composition 33 and also containing discrete conductive particles 34, such as lamp black. This mixture has a low order of specific-resistance as a whole, but the film-forming composition which alone contacts the dielectric film, may have a much higher order of specific-resistance per se.

Referring to Fig. 6, the anode metal body 30, such as an aluminum foil, is provided with a dielectric film 31, and this in turn is covered with a thin protective coating 32 which is sufficiently permeable to the film-forming composition 33 component of the electrolyte to permit the latter to heal the dielectric film in case of puncture, but is not permeable to discrete particles 34 contained in the electrolyte. The protective coating does not act as a dielectric, being much more conductive than the dielectric film proper, either due to its composition or to being permeated by the film-forming composition, or to both.

Since the protective coating is not permeable to these conductive particles, the latter are spaced away from the dielectric film sufficiently to prevent the reduction of sparking voltage that would otherwise result if the conductive particles were permitted to directly contact the dielectric film.

As the protective coating 32 may be made very thin, for example 1/1000 mm. in thickness, although it may have a rather high specific-resistance when permeated with film-forming composition, its extreme thinness makes for a low net resistance, thus imposing little actual resistance to the flow of current from the cathode. The main body of the electrolyte has a low specific-resistance due to the conductive filler therein, so that a high efficiency is obtained notwithstanding the employment of a high specific-resistance film-forming composition in the electrolyte.

This low resistance film-forming electrolyte material is particularly advantageous in the novel condenser construction herein described, employing an external cathode, because of its adaptability to the conditions of service in combination with the coated film type of anode, although the film-forming composition component may possess so high a specific-resistance that it could not be used alone as the electrolyte.

The preferred form of anode-electrolyte combination which I employ, embodying the features above-described and shown in Fig. 6, is described in detail and claimed in my copending application Ser. No. 711,286, filed February 14, 1934.

I prefer to use as film-forming compositions, homogeneous highly polymerized plastic reaction products of water soluble polyhydric alkyl compounds and water soluble polybasic film-forming acids, by which is meant acids which in aqueous solution permit the formation of aluminum oxide dielectric films on aluminum surfaces connected as anodes. These reaction products are esters which are polymerized by the interlink of the molecules into complex forms made possible by the presence of a plurality of replaceable radicals in both the polyhydric and polybasic materials utilized. The preferred compositions are uniform and have no suspended phase of solid particles, such as crystals; and are plastic in the sense of being coherent, amorphous and semi-solid, in contradistinction to viscous liquids which do not retain their shape to any practical extent.

I prefer to use the lower and less complex polyhydric alcohols, including both straight alcohols and alcohol ethers; such as the simple glycols, for example diethylene glycol; and glycerol; but higher polyalkyl and polyhydric water soluble alcohols may also be used, such as pentaerythrol, sorbitol, mannitol and dulcitol.

As examples of polybasic film-forming acids for use in this connection, I may mention boric acid; and water soluble hydroxy polycarboxylic acids, such as citric acid and tartaric acid. Each of these acids will produce plastic reaction and polymerization products. By employing mixtures of acids it is possible to obtain products of various degrees of plasticity from any given polyhydric compound.

I prepare the polymerized, plastic, reaction product produced by mixing the selected polyhydric compound and polybasic acid in approximately molecular proportions such that there is one hydroxyl (OH) radical to each acid (H) radical. This proportionality may be varied within fairly wide limits. The mixture is heated and during this heating the boiling point rises. The temperature is maintained at the boiling point until sufficient polymerization has occurred so that the product upon cooling to room temperature will be a plastic composition, preferably homogeneous and free from acid crystals. Heating will, in general, be required for a period of one to four hours, depending upon the rate at which heat is supplied to the mixture. By employing a suitable catalyst the polymerization can be facilitated.

Water will be produced as one product, but will largely be driven out by the prolonged heating, and hence the product may be termed semi-dry.

These plastic reaction and polymerization products are all hygroscopic to a greater or less degree, depending upon the particular product, and hence do not dry out when exposed to the atmosphere. They will, in consequence, maintain a balanced water content, and for this reason may be termed non-drying.

I prefer to adjust the hydroxyl ion concentration of these compositions, which when made from an alcohol and acid alone have specific-resistances greatly in excess of 500,000 ohms/cm$^3$ at room temperature, by adding a source of hydroxyl ions in sufficient amount to reduce the specific-resistance to within the range of 100,000–500,000 ohms/cm$^3$, and preferably to within the range of 150,000—300,000 ohms/cm$^3$. This may be accomplished by adding to the composition, either before or after heating, a small amount of a water soluble alkali salt of a film-forming acid, such as borax, sodium citrate, sodium tartrate, etc.; or a water soluble base, such as sodium hydroxide or potassium hydroxide; with or without the addition of a small amount of water. It is generally advisable to add a small amount of water to the plastic product, not enough being added to destroy the plasticity. The use of a salt rather than a base is preferred; and chlorides, sulfates and phosphates, for example, should be avoided, as these are not salts of acids which form true, substantially non-hydratable, films of the boric acid type.

As an example, a suitable plastic-film-forming composition can be prepared by heating a mixture of 62% by weight of glycerol and 38% of boric acid, until a boiling point of 170–175° C. is reached, ordinarily requiring several hours. An adhesive, hygroscopic, plastic mass results, having a specific-resistance of about 700,000 ohms/cm$^3$, upon cooling to room temperature.

The resistance is lowered to within the desirable range by adding, for example, a solution of equal parts by weight of water and borax, 5% of each relative to the weight of the glycerol, and heating to about 100° C. to permit of stirring thoroughly together. The plastic composition will now have a specific-resistance of about 165,000 ohms/cm$^3$ at 25° C.

A rubbery type of product can be obtained by using citric or tartaric acid, and may advantageously be added to a boric acid type of product to obtain a composition having a greater degree of coherency, making unnecessary the use of end sealing means in the condenser construction.

By adding about 10–50% of lamp black to the film-forming composition, the two being heated together to facilitate inter-mixing, the net specific-resistance of the resulting electrolyte can be decreased to a relatively low order of magnitude, for example to 1,000 ohms/cm$^3$ or less. The lamp black also serves to increase the mechanical strength so that thin pliant coherent sheets can be obtained.

Other conductive fillers can be used, such as graphite. Ground charcoal can be used, but due to the non-flaky character of the particles will not reduce the resistance of the electrolyte as much as flaky forms of carbon, such as lamp black and graphite. Most metals are unsatisfactory, due to becoming polarized or filmed in the presence of the film-forming composition, and in consequence acting as insulating fillers rather than as conductive fillers.

The anode which I prefer to use is formed of aluminum foil and has a layer next to the metal surface which comprises an "active" dielectric film and is of the type produced by electrolyzing the anode in a solution of boric acid and borax, or other electrolyte suitable to cause the formation of a good dielectric. This proximate film consists of a thin layer of highly insulating aluminum oxide having a thickness of the order of magnitude of about $10^{-4}$ to $10^{-5}$ mm. A property of such films is that their thickness is determined by the maximum voltage applied in forming, the limit imposed by the voltage not beng exceeded even though the voltage is applied for an unlimited period of time.

This active dielectric film is covered with an "inactive" layer which is a compound of the anode metal, and which affords a protective coating sufficiently permeable to the film-forming composition in the electrolyte to cause proper maintenance and healing of the dielectric film, but which is impermeable to conductive filler particles in the electrolyte. This type of layer may be formed upon an aluminum surface by electrolyzing the metal, as an anode, in a solution of sulfuric or phosphoric acid, for example. When superposed over an active dielectric type of film it is relatively conductive, even at low voltage, in the presence of hydroxyl ions, such as contained in the electrolyte, and does not function as a dielectric layer. Only when dry, and hence non-hydrated, is the outer layer highly insulating. That is, the layer is highly hydratable and when in the hydrated condition it operates as a porous conductive coating, the conductivity depending largely upon the degree of hydration.

In forming a double-layer anode of the type just described, the aluminum anode foil is first coated with the highly hydratable, conductive coating, as by electrolyzing as an anode in a $\frac{1}{10}$ normal aqueous solution of phosphoric acid, is thoroughly washed, and then is electrolyzed in a solution of boric acid and borax, or the like, to produce the active dielectric film beneath the conductive coating. The order of steps is irreversible; that is, the conductive coating cannot be produced on top of the highly insulating dielectric film, but must be produced first and then the active dielectric film is underimposed. The conductive coating may be made of any desired thickness when formed by electrolysis, since a characteristic of this type of film is that its thickness is not limited by the applied voltage, except at low voltages, but can be regulated, and is dependent upon the concentration and temperature of the electrolyte, the current density, and duration of treatment. Preferably, the conductive coating is formed to a thickness of no more than 1/1000 mm. when, if properly made, it has the appearance of a tough skin.

Further details of this type of anode are described in my copending application, Ser. No. 560,141, filed August 29, 1931, in which the same is claimed.

The electrolyte can be readily applied to the formed anode sheets as a thin layer, which may have a thickness of only 2-4 mils, and which because of its adhesive and plastic nature will remain in place, permitting ready assembly of the condenser.

The electrolyte may be formed into thin sheets, suitable for application upon the surface of electrode plates or strips, by extruding the electrolyte from a slit orifice of the desired width, at an elevated temperature which will permit the electrolyte to flow under a reasonable pressure; or in other simple ways. Instead of heating the electrolyte to permit of ready extrusion, a plasticizer may be added, for example acetone or a mixture of acetone and benzol, which will later evaporate from the extruded sheet.

The electrolyte may be dissolved in a volatile solvent, such as methyl alcohol, to produce a liquid which can be sprayed or painted on the electrode sheets, or the latter can be dipped therein and thus coated. The solvent is then allowed to evaporate off, leaving a thin coating on the electrode.

A thin aluminum electrode foil, coated with my preferred type of electrolyte, can be handled like a piece of thin flexible leather, and hence may be very readily handled in the asembly of condenser structure herein described.

While the invention has been particularly described with reference to the use of plastic electrolytes, the broad inventive concept also includes the use of high specific-resistance film-forming compositions, whether plastic or readily flowable, which could not be used satisfactorily alone with an outer cathode due to the excessive internal resistance, employed in conjunction with a conductive filler to reduce the resistance and with filmed anodes each of which is provided with a suitable coating to prevent contact of the conductive filler with the dielectric film and yet permit the film-forming component of the electrolyte to maintain and repair the dielectric film.

Having described several embodiments of my invention, what I claim is as follows:

1. An electrolytic condenser unit comprising a plurality of closely spaced superposed filmed anode strata and a single stratum of a low-resistance plastic non-drying electrolyte between each adjacent pair of anode strata and spacing the same, a body of said electrolyte encompassing the collective anode strata and communicating with the electrolyte therebetween, and an outer metallic cathode member in contact with said encompassing electrolyte body and mechanically spaced and secured thereby and in electrical connection through the electrolyte with all of the filmed anode strata.

2. An electrolytic condenser unit comprising a plurality of closely spaced superposed filmed anode strata and a single stratum of a low-resistance plastic non-drying adhesive electrolyte between each adjacent pair of anode strata and serving as mechanical spacing and retaining means, a body of said electrolyte encompassing the collective anode strata and communicating with the electrolyte therebetween, and an external metallic cathode encompassing the anode strata and in contact with the outer surface of the electrolyte body and mechanically spaced and secured by the latter.

3. An electrolytic condenser unit comprising a plurality of closely spaced superposed filmed anode strata each of which has at least one opening therein, a single stratum of a low-resistance plastic non-drying electrolyte between each adjacent pair of anode strata, spacing the same and filling the openings therein, a body of said electrolyte encompassing the collective anode strata and communicating with the electrolyte therebetween, and an outer metallic cathode in contact with said body of encompassing electrolyte and mechanically spaced and secured thereby to afford a cathode surface facing the openings in the anode strata.

4. An electrolytic condenser unit comprising a plurality of closely spaced superposed filmed anode strata and a single stratum of a plastic low-resistance electrolyte between each adjacent pair of anode strata, said electrolyte being composed of a high specific-resistance film-forming composition and a conductive filler and said filmed anode strata having thin protective coatings impermeable to the conductive filler and permeable to the film-forming composition, a body of said electrolyte encompassing the collective anode strata and communicating with the electrolyte therebetween, and an outer metallic cathode in contact with the encompassing electrolyte body and mechanically spaced and secured thereby.

5. An electrolytic condenser unit comprising a plurality of closely spaced filmed aluminum anode strata provided with integral protective coatings of a highly hydratable aluminum compound, a single stratum of an adhesive non-flowing and non-drying electrolyte between each adjacent pair of anode strata, comprised essentially of a plastic reaction and polymerization product of water-soluble polyhydric alkyl compound and water-soluble polybasic film-forming acid and containing a conductive filler, a body of said electrolyte encompassing the collective anode strata and communicating with the electrolyte therebetween, and an outer metallic cathode in contact with the encompassing electrolyte body and mechanically spaced and secured thereby and in electrical connection through the electrolyte with all the filmed anode strata.

6. An electrolytic condenser unit comprising a plurality of closely spaced superposed rectangular filmed anode plates and a single stratum of a low-resistance plastic non-drying electrolyte between each adjacent pair of anode plates and mechanically spacing the same, a body of said electrolyte encompassing the collective anode plates and communicating with the electrolyte therebetween, and an external metallic cathode wrapper encompassing the anode plates and mechanically spaced and secured by said body of electrolyte.

7. An electrolytic condenser unit comprising a plurality of closely spaced superposed filmed anode plates and a single stratum of a low-resistance non-flowing adhesive non-drying film-forming electrolyte between each adjacent pair of anode plates, spacing the same and retaining them in their relative positions, and outer metallic cathode and a cooperating body of said electrolyte material mechanically spacing said cathode from the anodes and affording electrical connection with the electrolyte material between the anodes.

8. An electrolytic condenser unit comprising a pair of stiff rectangular superposed cathode plates and a plurality of closely spaced superposed rectangular filmed anode plates of less width lying between the said cathode plates and in parallel spaced relation, the lateral edges of the cathode plates projecting beyond the edges of the anode plates, a low-resistance plastic non-drying electrolyte lying between the plates and disposed so as to permit the conduction of current between all points of the electrolyte, a layer of electrolyte on the outer face of each cathode plate, and a lateral metallic wrapper encompassing the foregoing assembly to afford a cathode terminal.

9. An electrolytic condenser unit comprising a series of superposed electrode plates in parallel spaced relation, the interior plates constituting a plurality of filmed anodes and the outer plates being stiff cathodes mechanically protecting the anode plates, a low-resistance plastic non-drying electrolyte lying between the plates, encompassing the anode plates, and coating the outer faces of the cathode plates, and a metallic wrapper encompassing the foregoing assembly.

10. An electrolytic condenser unit comprising a plurality of superposed closely spaced rectangular filmed aluminum foil plates in parallel spaced relation and a single layer of an adhesive low-resistance plastic non-drying electrolyte between each adjacent pair of said plates, a substantial length of said plates being free of the electrolyte to act as cooling fins, and a layer of said electrolyte on the outer face of each of the outer plates in alignment with the electrolyte therebetween, all layers of electrolyte extending beyond the lateral edges of said plates and joining thereat, a pair of stiff metallic plates contacting each of the outer electrolyte layer surfaces and likewise extending beyond the lateral edges of the filmed plates, a layer of the electrolyte on each of the outer faces of the stiff metallic plates, and a metallic wrapper extending laterally around the foregoing assembly to afford a cathode to which connection is made.

11. A condenser according to claim 8 having the anode plates provided with openings and the electrolyte layers on each side of said plates communicating through said openings.

12. A condenser according to claim 10 having the filmed plates provided with openings and the electrolyte layers on each side of said plates communicating through said openings.

13. An electrolytic condenser unit comprising a plurality of closely spaced superposed filmed aluminum anode plates provided with integral protective coatings of a highly hydratable compound of the aluminum, a single stratum of a low-resistance electrolyte lying between each adjacent pair of anode plates, said electrolyte being essentially comprised of a plastic reaction and polymerization product of a lower polyhydric alcohol and at least one acid of the class of boric acid, citric acid and tartaric acid, and containing an admixed conductive filler, a body of said electrolyte encompassing the anode plates and communicating with the electrolyte therebetween, and an outer metallic cathode in contact therewith and mechanically spaced and secured thereby.

14. An electrolytic condenser unit comprising a coiled filmed anode and a single layer of a low-resistance non-drying plastic electrolyte between adjacent turns thereof, an outer body of the electrolyte communicating with the electrolyte lying between the turns of the coiled anode, and an external cathode in contact with said outer body of the electrolyte and mechanically spaced and secured thereby.

15. An electrolytic condenser unit comprising a coiled filmed anode and a single layer of a low-resistance non-drying plastic electrolyte between adjacent turns thereof and a further communicating layer of said electrolyte encircling the coiled anode and in contact therewith, and a metallic wrapper encircling the foregoing assembly and mechanically spaced and secured by the electrolyte to afford a cathode connection.

16. A condenser according to claim 15 having the anode provided with openings.

17. An electrolytic condenser unit comprising a coiled aluminum anode filmed with a dielectric layer provided with an integral protective coating of a highly hydratable compound of the aluminum, a single layer of a low-resistance electrolyte lying between adjacent turns thereof, and an outer body of the electrolyte communicating therewith, said electrolyte being essentially comprised of a plastic reaction and polymerization product of a lower polyhydric alcohol and at least one acid of the class of boric acid, citric acid and tartaric acid, and containing an admixed conductive filler, and an external metallic cathode in contact with the outer body of electrolyte and mechanically spaced and secured thereby.

JULIUS EDGAR LILIENFELD.